E. SAVERY.
AIR MOISTENER.
APPLICATION FILED MAY 1, 1920.
1,430,119.
Patented Sept. 26, 1922.
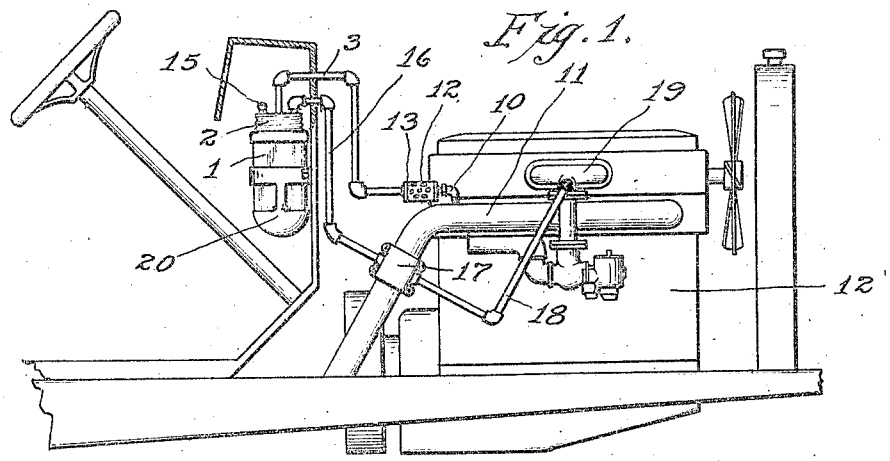
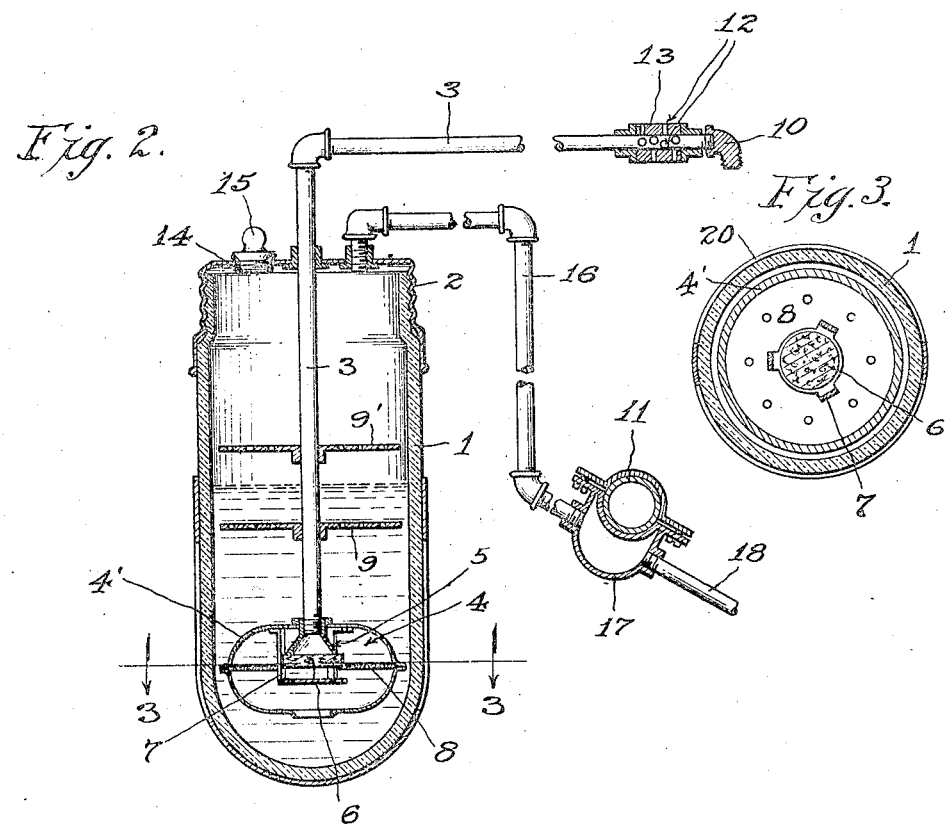
INVENTOR.
Edwin Savery
BY Acker & Totten
his ATTORNEYS.

Patented Sept. 26, 1922.

1,430,119

UNITED STATES PATENT OFFICE.

EDWIN SAVERY, OF SAN FRANCISCO, CALIFORNIA, ASSIGNOR TO BOESCH LAMP COMPANY, OF SAN FRANCISCO, CALIFORNIA, A CORPORATION OF CALIFORNIA.

AIR MOISTENER.

Application filed May 1, 1920. Serial No. 378,236.

*To all whom it may concern:*

Be it known that I, EDWIN SAVERY, a citizen of the United States, residing at the city and county of San Francisco and State of California, have invented certain new and useful Improvements in Air Moisteners, of which the following is a specification.

The hereinafter described invention relates to means for supplying heated moisture laden air to the cylinders of internal combustion engines simultaneously with the feed of the explosive mixture therein; and has for one of its objects to provide a simple, inexpensive, efficient and durable device for accomplishing the above purpose and which is applicable to all types of combustion engines and more particularly for the engines of motor driven vehicles.

Other objects and advantages will be readily appreciated from the description hereinafter given as to the construction and operation of the device.

To comprehend the invention, reference should be had to the accompanying sheet of drawings illustrative of the preferred embodiment of a practical apparatus for the carrying out of the same, and wherein—

Figure 1 is a view in side elevation of the attachment applied to the combustion engine of a motor driven vehicle.

Figure 2 is a broken detail sectional view of the liquid holding container, the means for supplying heated air thereto and withdrawing moisture laden air therefrom and the means within the container for breaking up or atomizing the liquid therein.

Figure 3 is a sectional view taken on the line 3—3, Fig. 2 of the drawings, and viewed in the direction of the arrows.

The invention comprises preferably a glass container 1 of a size sufficient to hold the requisite quantity of water to last for approximately one hundred and twenty-five miles of travel of an automobile, said quantity being about one quart of water. Within the container which is closed by a cap 2, extends an air supply pipe 3, said pipe terminating a short distance from the bottom of the container and extended within the chamber 4, of a casing 4' situated in the container. The said air supply pipe is provided at its lower end with an outwardly flared perforated nozzle 5, which at times is closed by a float valve 6. This valve is held against displacement by means of the guides 7, downwardly extended within the chamber 4 and which are united at their lower ends in order to form a retaining cage for the said float valve 6. The interior of the chamber 4 is sub-divided by a perforated diaphragm 8 and the bottom section of casing 4' is perforated so as to permit of water flowing into and out of the same. For convenience, hereafter the casing 4' shall be referred to as a perforated retention chamber.

Within the container 1 there is arranged a plurality of perforated spaced diaphragms 9—9', which are secured to the air inlet pipe 3 in any suitable manner.

The free or outer end of the air feed or inlet pipe 3 connects, in the present case, with a heating plug 10, which is adapted for attachment to the exhaust manifold 11 of the explosive engine 12', the said air pipe 3 adjacent such end being provided with a series of perforations 12 which are controlled by a rotatable ported sleeve valve 13, by means of which the admission of air into the pipe 3 through the perforations 12 is controlled or regulated.

Water for filling the container 1 is admitted through the filling opening 14, which is closed by a cap 15, and from said container 1 is extended an outlet pipe 16, the free end of which communicates with a stove 17 surrounding the manifold exhaust pipe 11. From the stove 17 is extended a pipe connection 18, which may be treated as a continuation of the pipe 16 and which connects with the intake manifold 19 of the engine.

In operation, the container 1 being filled with water to the proper level, slightly above the diaphragm 9, air on the suction stroke of the engine will be drawn through the pipe 3 and discharged therefrom into the retention chamber 4' as a jet stream. Inasmuch as the end of the pipe 3 adjacent the exhaust manifold is highly heated from the attachment 10 by the hot products of combustion passing through the exhaust manifold, the air entering the pipe 3 through the perforation 12 is heated and as a heated stream of air discharges under suction pressure into the retention chamber 4' for a heating of the water contained within the container 1. The suction created by the vacuum within the engine cylinder during the operation of the piston therein, causes a rapid upward flow of the air delivered into the container 1, which causes rapid agitation of the water therein and as the same is subjected to a breaking up action by the perforated casing 4' and diaphragm 9 and 9', there is an atomization of the liquid and a quick liberation of the air therefrom, which ascends to the upper portion of the chamber and forms therein as a mist, which is withdrawn therefrom through the suction pipe 16 and discharged into the stove 17 as heated water laden or saturated air. As the saturated air is delivered into and passed through the stove 17, the same is super-heated and passes therefrom to the inlet manifold 19 for intermingling with the gaseous mixture flowing therethrough to the engine cylinder.

A float valve 6 within the retaining cage formed by guides 7, normally seals the nozzle 5 of pipe 3, and is unseated on a suction stroke of the engine.

It will be observed that on each suction stroke of the engine a quantity of heated air is drawn into the container and discharged therein as a jet stream, said air being upwardly drawn through the body of water within the container and ascending to the upper portion of the container as a mist, the liquid through which the air is passed being maintained in a condition of agitation and forcibly subjected to the perforated diaphragms, for breaking up or atomization, the mist or moisture laden air withdrawn from the container and discharged into the stove 17 for super-heating and withdrawn therefrom for discharge into the intake manifold for an intermingling with the gaseous mixture passing therethrough.

The container 1 may be situated at any convenient point, in the present case being illustrated as detachably secured in position by a retaining bracket 20. By forming the container of glass, the action of the liquid contained therein is readily apparent.

The container 1 being of suitable transparent material enables the operator at all times to observe the operation of the apparatus and to ascertain the water level therein. This type of container, due to its transparency, enables others not familiar with the operation of the device to readily understand the operation thereof on viewing the container with the motor 12' in operation.

Having thus described the invention what is claimed as new and desired to be protected by Letters Patent is:—

In an attachment for internal combustion motors, the combination with a liquid holding container, a cover for detachably securing thereto to close the same, an air inlet pipe carried by and extended through the cover for projection into the container, a discharge nozzle at the lower end thereof, a float valve for normally closing the same, a cage carried by said pipe for retaining the valve, a plurality of mixing devices carried by the pipe, a vapor outlet leading from the container through said cover, said cover and elements carried thereby adapted for removal from the container as a unit.

In testimony whereof I have signed my name to this specification.

EDWIN SAVERY.